1US010696471B2

(12) United States Patent
Ovitt et al.

(10) Patent No.: US 10,696,471 B2
(45) Date of Patent: Jun. 30, 2020

(54) ENCLOSURE FOR GLOVES WITH ANTIMICROBIAL INK COATING AND METHODS FOR MAKING THE SAME

(71) Applicant: Medline Industries, Inc, Northfield, IL (US)

(72) Inventors: Alyson Ovitt, Gurnee, IL (US); Paul Lishnevsky, Buffalo Grove, IL (US)

(73) Assignee: Medline Industries, Inc., Northfield, IL (US)

( * ) Notice: Subject to any disclaimer, the term of this patent is extended or adjusted under 35 U.S.C. 154(b) by 7 days.

(21) Appl. No.: 15/799,394

(22) Filed: Oct. 31, 2017

(65) Prior Publication Data

US 2019/0127143 A1    May 2, 2019

(51) Int. Cl.

| *B65D 85/18* | (2006.01) |
|---|---|
| *B65D 25/14* | (2006.01) |
| *B65D 25/34* | (2006.01) |
| *B65D 83/08* | (2006.01) |
| *C09D 5/14* | (2006.01) |
| *A01N 59/16* | (2006.01) |
| *A01N 65/42* | (2009.01) |

(Continued)

(52) U.S. Cl.
CPC ............. *B65D 85/18* (2013.01); *A01N 27/00* (2013.01); *A01N 37/34* (2013.01); *A01N 43/40* (2013.01); *A01N 43/80* (2013.01); *A01N 47/44* (2013.01); *A01N 59/16* (2013.01); *A01N 65/42* (2013.01); *B65B 5/00* (2013.01); *B65D 5/563* (2013.01); *B65D 25/14* (2013.01); *B65D 25/34* (2013.01); *B65D 83/0805* (2013.01); *B65D 83/0817* (2013.01); *C09D 5/14* (2013.01); *C09D 7/40* (2018.01)

(58) Field of Classification Search
CPC ........ B65D 81/24; B65D 85/18; B65D 25/14; B65D 83/0817; B65D 206/292–294; A01N 59/16
USPC .................................................... 206/292–294
See application file for complete search history.

(56) References Cited

U.S. PATENT DOCUMENTS

| 3,737,093 A | * | 6/1973 | Amberg | ............. B65D 21/0233 |
|---|---|---|---|---|
| | | | | 206/447 |
| 4,997,105 A | * | 3/1991 | Fischer | .................... B65D 5/16 |
| | | | | 206/278 |

(Continued)

FOREIGN PATENT DOCUMENTS

| CA | 2915951 A1 | * 12/2014 | ............. A01N 35/02 |
|---|---|---|---|
| CN | 100407922 | 8/2008 | |

(Continued)

OTHER PUBLICATIONS

" 'Safe to Touch Print' Presentation", Bioseal; www.bioseal.co.uk; Unknown publication date but prior to filing of present application.

*Primary Examiner* — Sue A Weaver
(74) *Attorney, Agent, or Firm* — Philip H. Burrus, IV (57) ABSTRACT

A container (100) includes a first side (101) defining an aperture (107), a second side (102), and a plurality of other sides (103,104,105). The first side, the second side, the plurality of other sides defining an interior volume (106) of the container. A plurality of gloves (1001) is disposed within the interior volume such that one or more gloves may be drawn from the container through the aperture. An antimicrobial coating (302) disposed upon one or more of the first side, the second side, and the plurality of sides.

20 Claims, 6 Drawing Sheets

(51) Int. Cl.
*A01N 43/80* (2006.01)
*A01N 43/40* (2006.01)
*B65B 5/00* (2006.01)
*C09D 7/40* (2018.01)
*A01N 47/44* (2006.01)
*A01N 37/34* (2006.01)
*B65D 5/56* (2006.01)
*A01N 27/00* (2006.01)

(56) References Cited

U.S. PATENT DOCUMENTS

| | | | |
|---|---|---|---|
| 5,464,851 | A | 11/1995 | Morpeth |
| 7,112,630 | B2 | 9/2006 | Lee et al. |
| 7,115,641 | B2 | 10/2006 | Merianos et al. |
| D710,215 | S | 8/2014 | Palmer et al. |
| 9,114,187 | B2 | 8/2015 | Hofer et al. |
| 9,771,201 | B2 | 9/2017 | Yao et al. |
| 2002/0043537 | A1* | 4/2002 | Serbiak ............ A47K 10/421 221/33 |
| 2003/0091767 | A1* | 5/2003 | Podhajny ............ A01N 25/34 428/35.7 |
| 2004/0245269 | A1* | 12/2004 | Grinberg ............ B65D 77/2024 221/38 |
| 2005/0244515 | A1 | 11/2005 | Tsuchida et al. |
| 2006/0246149 | A1 | 11/2006 | Bucholz et al. |
| 2007/0203504 | A1 | 8/2007 | Denny et al. |
| 2007/0275094 | A1 | 11/2007 | Thompson et al. |
| 2010/0068236 | A1* | 3/2010 | Peltz ............ A01N 25/34 424/405 |
| 2010/0119461 | A1 | 5/2010 | Bicard-Benhamou et al. |
| 2013/0186787 | A1* | 7/2013 | Yao ............ B65D 85/18 206/278 |
| 2013/0269569 | A1* | 10/2013 | Tabayashi ............ C09D 11/32 106/31.65 |
| 2015/0024094 | A1* | 1/2015 | Keller ............ B65D 81/24 426/106 |
| 2015/0289938 | A1* | 10/2015 | Yao ............ B65D 85/18 206/213 |
| 2015/0329275 | A1* | 11/2015 | Silkaitis ............ B65D 75/54 206/278 |
| 2016/0310231 | A1 | 10/2016 | Cohen |

FOREIGN PATENT DOCUMENTS

| | | |
|---|---|---|
| CN | 100589698 | 2/2010 |
| CN | 101585983 | 8/2011 |
| CN | 102942822 | 2/2013 |
| CN | 104194469 | 12/2014 |
| CN | 104877437 | 9/2015 |
| CN | 104017434 | 3/2016 |
| CN | 104277582 | 10/2016 |
| EP | 160322 | 11/1985 |
| EP | 0749848 | 12/1996 |
| EP | 2035398 | 4/2013 |
| GB | 2471394 | 12/2010 |
| GB | 2473599 | 3/2011 |
| GB | 2504764 | 2/2014 |
| JP | 62005936 | 1/1987 |
| JP | 10230579 | 9/1998 |
| JP | 1160418 | 3/1999 |
| JP | 11181697 | 7/1999 |
| JP | 2000080596 | 3/2000 |
| JP | 2002241660 | 8/2002 |
| JP | 200663241 | 3/2006 |
| JP | 20079046 | 1/2007 |
| JP | 2010194723 | 9/2010 |
| JP | 2010209490 | 9/2010 |
| JP | 2011046893 | 3/2011 |
| JP | 2017025303 | 2/2017 |
| KR | 1012120 | 3/1982 |
| KR | 2003004907 | 6/2003 |
| KR | 1020060028097 | 3/2006 |
| KR | 100637723 | 10/2006 |
| KR | 100734909 | 6/2007 |
| KR | 20080006684 | 12/2008 |
| KR | 20080006685 | 12/2008 |
| KR | 20150127950 | 1/2014 |
| KR | 1351348 | 8/2014 |
| WO | 1999042658 | 8/1999 |
| WO | 20130176697 | 5/2013 |
| WO | 20130675190 | 5/2013 |
| WO | 2013112440 | 8/2013 |

* cited by examiner

ENCLOSURE FOR GLOVES WITH ANTIMICROBIAL INK COATING AND METHODS FOR MAKING THE SAME

BACKGROUND

Technical Field

This invention relates generally to containers, and more particularly to containers for gloves.

Background Art

Gloves are used to protect the hands of a user. In many industries, such as medical and surgical industries, the use of gloves is not only a protective measure, but is a requirement. Medical services personnel, for example, are required to wear disposable gloves to prevent contact with bodily fluids during surgical procedures, medical examinations, laboratory testing and other medical procedures. Disposable gloves have traditionally been made of rubber materials such as latex, thermoplastic materials such as vinyl, and other natural and synthetic materials.

Many gloves are provided in packaging where one or more gloves are disposed in an interior of a package. Such packaging frequently includes an opening through which a user may draw one or more gloves.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive.

Also, reference designators shown herein in parenthesis indicate components shown in a figure other than the one in discussion. For example, talking about a device (10) while discussing figure A would refer to an element, 10, shown in figure other than figure A. It is expected that one of ordinary skill, notwithstanding possibly significant effort and many design choices motivated by, for example, available time, current technology, and economic considerations, when guided by the concepts and principles disclosed herein will be readily capable of generating embodiments configured in accordance with the disclosure.

Embodiments of the disclosure contemplate that contamination occurs on the inside and/or outside of glove dispenser boxes in a health care environment. For example, a health care practitioner who inadvertently forgets to wash their hands before reaching into a glove dispenser box potentially contaminates all gloves within the dispenser box. This problem is exacerbated when the person sticks their hand all the way inside the glove dispenser box and then drags their skin along surfaces, or openings, of the glove dispenser box.

Embodiments of the disclosure also contemplate that most glove dispenser boxes include openings that are always open, thereby exposing the uppermost glove or gloves to the environment. Accordingly, airborne transmission of bacteria can contaminate these exposed gloves. This is in addition to the exposure that can come from a person touching these gloves. Where one or more gloves situated within a glove dispenser box become contaminated, the contaminant can spread to a patient who is handled or manipulated by a practitioner wearing the contaminated gloves.

To eliminate this problem, embodiments of the disclosure advantageously provide for a glove dispenser box that is coated with an antimicrobial ink. In one embodiment, an exterior of the glove dispenser box is coated with the antimicrobial ink. In another embodiment, the interior of the glove dispenser box is coated with the antimicrobial ink. In still another embodiment, both the interior and the exterior of the glove dispenser box are coated with the antimicrobial ink. Advantageously, coating the interior and/or exterior of the glove dispenser box with such antimicrobial formulations works to kill bacteria and other pathogens, thereby preventing or decreasing the likelihood of cross-contamination between patients.

Figure 1:
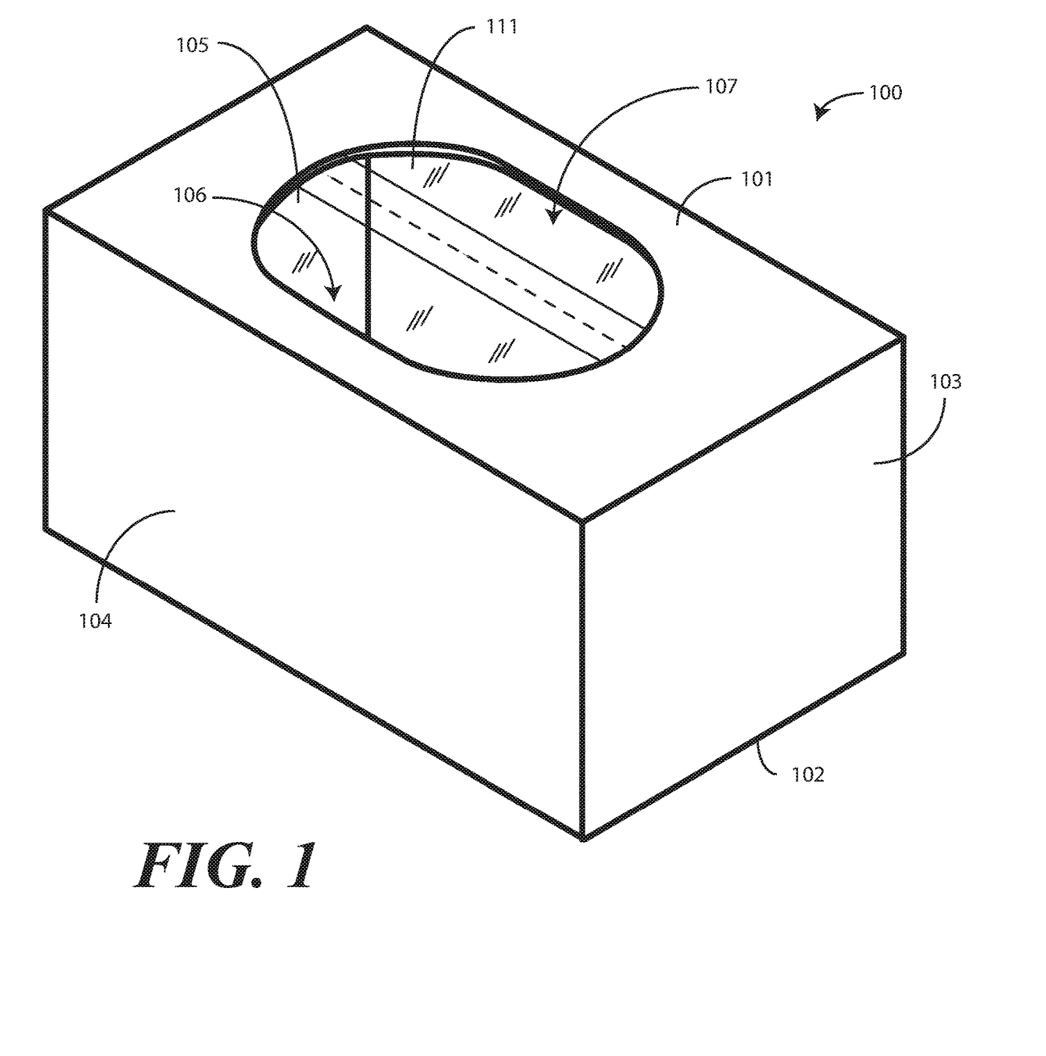
FIG. 1 illustrates one explanatory container in accordance with one or more embodiments of the disclosure.

Turning now to FIG. 1, illustrated therein is one explanatory container 100 configured in accordance with one or more embodiments of the disclosure. In one or more embodiments, the container 100 comprises a glove dispenser box. While a substantially rectangular glove dispenser box is shown for illustrative purposes in FIG. 1, it should be noted that the glove dispenser box can take any number of shapes.

The container 100 of FIG. 1 may be manufactured from any of a variety of materials or combinations of materials, including paper, cardboard, plastic, metal, or fabric. In the illustrative embodiment of FIG. 1, the container 100 is manufactured from single-ply cardboard. Where the container 100 is manufactured from plastic, the plastic may be a thermoform plastic or other rigid plastic and may be transparent, semi-transparent or non-transparent. Regardless of whether cardboard, metal, plastic, or fabric, the container 100 may be of any desired color. Other materials will be obvious to those of ordinary skill in the art having the benefit of this disclosure. The container 100 may have letters, pictures, logos, designs, instructions for using the contents therein, and/or other markings placed thereon through printing, engraving, molding, or any other suitable method.

The container 100 includes a first side 101, a second side 102, and a plurality of other sides 103,104,105. In one embodiment, the first side 101 defines a first major face of the container 100, while the second side 102 defines a second major face of the container 100. The plurality of other sides 103,104,105 define minor faces of the container 100 that are disposed between the first major face 101 and the second major face 102 of this embodiment, thereby giving the container 100 a rectangular appearance. As noted above, it will be obvious to those of ordinary skill in the art having the benefit of this disclosure that the container 100 can be configured in other shapes as well, including cubes, cylinders, pyramids, and other shapes.

In this illustrative embodiment, the first side 101 is disposed opposite the plurality of other sides 103,104,105 from the second side 102. Said differently, in this embodiment, the first side 101 is the top of the container, the second side 102 is the bottom of the container, and the plurality of other sides 103,104,105 are disposed between the top and the bottom.

In one embodiment, one of the sides defines an aperture 107. In this illustrative embodiment, the first side 101 defines the aperture 107. In other embodiments, the aperture 107 can be disposed on the second side 102. In still other embodiments, the aperture 107 can be disposed on one of the plurality of other sides 103,104,105. In still other embodiments, multiple apertures can be disposed on multiple sides.

In one embodiment, the aperture 107 allows one or more gloves (shown below with reference to FIG. 10) to be drawn through the aperture 107 from the container 100. Said differently, a user can remove one or more of the gloves from the container by drawing them through the aperture 107. The aperture 107 may be configured in the form of different shapes, such as a circle, an oval, a square, a rectangle, or any variation of such shapes, such that a user may insert his or her fingers or a portion of the hand through the aperture 107 to remove one or more of the gloves.

In one embodiment, the aperture 107 may initially be covered by a removable segment (not shown) that is initially formed as part of the container 100. The removable segment, in one embodiment, is separable from the container 100 by a perforation or a perforated segment. Once the container is ready for use by a user, in one embodiment the user may tear the removable segment away from the container 100 along the perforation or perforated segment. The removable segment is generally discarded after it is removed from the container 100. In addition to a perforated segment, the removable segment may include an adhesive segment that is removable from the container 100 as well. In still other embodiments, the aperture 107 will simply be covered by a lid that may pivot relative to the first side 101 of the container 100. Other coverings and closures for the aperture 107 will be obvious to those of ordinary skill in the art having the benefit of this disclosure.

In this illustrative embodiment, the first side 101, the second side 102, the plurality of other sides 103,104,105 define an interior volume 106 of the container 100. A plurality of gloves (shown below in FIG. 10) is disposed within the interior volume 106 such that one or more gloves may be drawn from the container 100 through the aperture 107. In one embodiment, both the interior volume 106 and the plurality of gloves are configured to be sterile such that they are immediately ready for use in medical procedures without additional cleaning or sterilization.

The plurality of gloves may comprise medical and/or surgical gloves that are optionally disposable in one or more embodiments. Alternatively, the plurality of gloves may be other types of gloves, e.g., non-medical or non-surgical gloves. Other types of gloves suitable for use with containers configured in accordance with one or more concepts described herein will be obvious to those of ordinary skill in the art having the benefit of this disclosure. The plurality of gloves may be non-transparent, transparent or semi-transparent. Further, the plurality of gloves may have any desired color. Each glove of the plurality of gloves can be a fingered glove with defined fingers, or alternatively a mitten style glove with one compartment for the fingers and another for the thumb. The plurality of gloves may all be of the same size, or alternatively may have different sizes. Different sizes may be placed into a single container 100, or different sizes may be placed in different containers. The size of the container 100 can vary based upon the size of the gloves disposed therein.

In one embodiment, the plurality of gloves is manufactured from rubber materials such as latex. In other embodiments, the plurality of gloves is manufactured from thermoplastic materials such as vinyl. In still other embodiments, the plurality of gloves is manufactured from and other natural and synthetic materials, such as nitrile, polyvinyl chloride, polyethylene, polyisoprene, neoprene, polychloriprene, etc. Other materials suitable for the manufacture of the plurality of gloves will be obvious to those of ordinary skill in the art having the benefit of this disclosure.

The plurality of gloves may be stacked in a uniform direction, for example, with all the finger portions pointing in the same direction. The plurality of gloves may also be arranged in an alternating fashion, with each subsequent glove being rotated 60, 90, or 180 degrees out of phase with the preceding glove. In another embodiment, the plurality of gloves may be randomly disposed within the container 100. Force coefficients to remove one or more of the plurality of gloves from the container 100 may be associated with each arrangement. In one embodiment, the force coefficient associated with the random disposition of the plurality of gloves in the container 100 will have the highest force coefficient.

In one or more embodiments, each glove of the plurality of gloves may comprise or include other materials, such as antimicrobial coatings and/or coatings for protecting the skin that include aloe, oatmeal, chamomile, vitamin(s), or combinations thereof. In other embodiments, each glove of the plurality of gloves may comprise other suitable ingredients that may provide skin care benefits, such as moisturizing and soothing dry, irritated skin. Other glove additives will be obvious to those of ordinary skill in the art having the benefit of this disclosure.

In one embodiment, the container 100 may comprise a barrier 111 that spans and/or covers at least a portion of the aperture 107. The barrier 111 may be a film, a piece of paper laminated with film or any type of flexible material that is suitable for providing or acting as a barrier. In one or more embodiments, the barrier 111 inhibits or prevents microorganisms, pathogens, small airborne particles of dust and debris and other air contaminants from contacting and thus contaminating the plurality of gloves prior to removal from the container 100.

In one or more embodiments, the barrier 111 helps to protect the plurality of gloves from being exposed to undesirable materials or contaminants while the plurality of gloves is disposed within the container 100 beneath the barrier. Advantageously, providing a plurality of gloves that is free from undesirable materials or contaminants reduces the risk, when those gloves are used for healthcare procedures, that patients and healthcare workers will be exposed to such materials or contaminants. Where the plurality of gloves and the interior volume 106 are sterile, this configuration further reduces the opportunity to spread potentially harmful and infectious materials or contaminants. Furthermore, providing a plurality of gloves that are free from undesirable materials or contaminants also reduces or prevents cross-contamination that may occur between different patients.

A second advantage of including the optional barrier 111 is that it provides an indicator of tampering for a user. In addition to providing a more sanitary dispensing package, the barrier 111 provides a temper-proof covering over the aperture 107. Any attempt to disturb the barrier 111 is likely to be clearly visible to a user. The user therefore would be alerted to any tampering.

In one embodiment, the barrier 111 is manufactured from a film. The film can be any of a variety of materials, including polypropylene, polystyrene, polyester, polyamide, polyvinylchloride, polyethylene (low density polyethylene, medium density polyethylene and/or high density polyethylene), polyvinylidene chloride, regenerated cellulose, cellulose acetate, and/or combinations thereof. The film material selected may be based on factors such as cost, shelf life, barrier effectiveness, performance, etc. The film, including the paper-laminated film and any of the embodiments described herein, may have a thickness of less than about 10 mils, particularly from about 1 mil to about 6 mils. The thickness may be selected based on a variety of factors such as barrier effectiveness, cost, material(s) used, performance characteristics such as transparency and flexibility, etc. The film may be clear or colored. The film may also be printed or plain, and may be flat, patterned or embossed. Also, the film may be laminated with one or more other materials, in addition to paper, such as foil, vinyl or other materials. The film, including the paper-laminated film and any of the embodiments described herein, helps to prevent exposure of the inside of the container 100 to microorganisms, airborne particles and other materials or contaminants.

The barrier 111 may be a single sheet of film or may be multi-layered. Where laminated, the layers of the barrier 111 may comprise the same type of or different materials. The barrier 111 may also cover all or a portion of the first side 101 of the container 100, and may include an opening, aperture or slit in the middle of the barrier 111 for removing the gloves from the container. In one or more embodiments, providing additional materials and/or additional layers may provide better protection than a single layer. In one or more embodiments, the barrier includes an antimicrobial material as described in commonly assigned, co-pending U.S. application Ser. No. 13/790,091, filed Mar. 8, 2013, which is incorporated herein by reference for all purposes.

Figure 2:
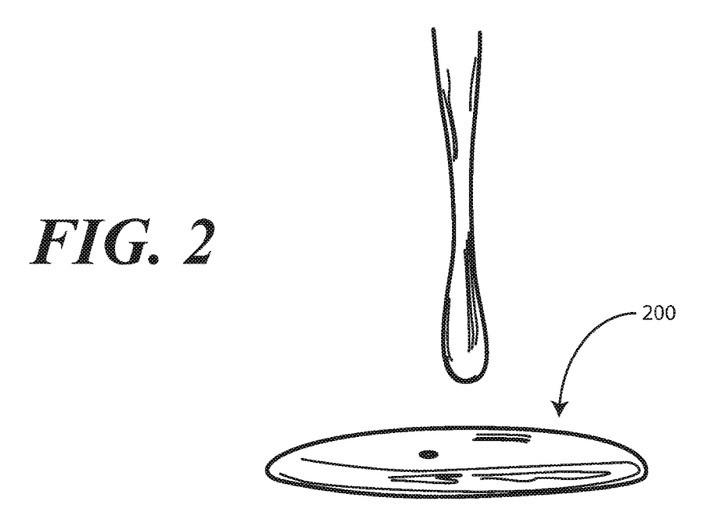
FIG. 2 illustrates one explanatory antimicrobial coating in accordance with one or more embodiments of the disclosure.

Turning now to FIG. 2, illustrated therein is one embodiment of an antimicrobial ink 200. The antimicrobial ink 200 is shown in liquid form in FIG. 2. In one or more embodiments, the antimicrobial ink 200 is an antimicrobial print coating that can be applied to one or more of an interior, exterior, or combinations thereof of the container (100) of FIG. 1 to help prevent cross contamination.

In one or more embodiments, the antimicrobial ink 200 can be blended into other coatings as well. For example, in one or more embodiments the antimicrobial ink 200 can be blended into paint that is applied to the container (100). In another embodiment, the antimicrobial ink 200 is blended into an inorganic or organic overlay that is disposed along the container (100). In one or more embodiments, the antimicrobial ink 200 can be blended into various print coatings, be they water based, oil based, or ultraviolet barriers. One suitable antimicrobial ink 200 for use with embodiments of the disclosure is marketed under the trade name BIOSEAL.sup.™ Others will be described in more detail below. Still others will be obvious to those of ordinary skill in the art having the benefit of this disclosure.

In one or more embodiments, the antimicrobial ink 200 helps to prevent the colonization of microbes, bacteria, and other pathogen. This prevention can take various forms, including acting as a fungicide or antimicrobial killer of pathogens. In one or more embodiments, the antimicrobial ink 200 is designed to kill one or more of *campylobacter*, methicillin-resistant *Staphylococcus aureus* (MRSA), *e coli*, *Enterobacter cloacae*, *Escherichia coli*, *Klebsiella pneumonia*, *Lactobacillus casei*, *Listeria monocytogenes*, *Pseudomonas aeruginosa*, *Salmonella*, *staphylococcus*, *Stenotrophomonas maltophilia*, and various strains of *streptococcus*.

In another embodiment, the antimicrobial ink 200 comprises an aqueous ink composition that includes water, an optional co-solvent, an optional colorant, and composite nanoparticles. In one embodiment, each nanoparticle can include a core and a shell. In one embodiment the core comprises a styrene/acrylate polymer core resin and optionally comprises a metal. In one embodiment, the shell comprises a metal. The composite nanoparticle core resin can then be selected from the group consisting of styrene acrylates, styrene butadienes, styrene methacrylates and combinations thereof.

In another embodiment, the antimicrobial ink 200 comprises a fluid for use in reducing the bacteria count on surfaces of containers. The antimicrobial ink 200 can comprise a non-toxic sterile ink like material that, when applied to a container disappears after a certain amount of time in the presence of water. The non-toxic sterile ink can be a natural product of quercus infectoria or similar agent that functions as an antimicrobial reagent against *staphylococcus*, *pseudomonas* and common viral agents.

In another embodiment, the antimicrobial ink 200 comprises a water-tolerant and heat-resistant ultraviolet curable ink. The water-tolerant and heat-resistant ultraviolet curable ink can be prepared from the following raw materials in percentage by mass: 20%-50% of a mixture of aliphatic polyurethane acrylate oligomer and tripropylene glycol diacrylate, 5%-15% of an initiator, 1%-3% of surface auxiliaries, 5%-10% of a cosolvent, 10%-20% of a reactive diluent, 1%-2% of a nano-silver antimicrobial agent and 20-30% of an inert solvent. The water-tolerant and heat-resistant ultraviolet curable ink has high-performance water-tolerant and heat-resistant capability without affecting the intrinsic pollution tolerance, salt fog resistance, ageing resistance, abrasive resistance, scratch resistance, adhesion and cold-heat impact resistance of the ink.

In another embodiment, the antimicrobial ink 200 comprises a garlicin antimicrobial water-based ink belonging to the field of printing inks. In one embodiment, the garlicin antimicrobial water-based ink is prepared from the following components in percentage by weight: 25-35% of water-soluble resin, 5.0-10% of pigment, 20-30% of low-Tg-value acrylic emulsion, 10-15% of garlicin, 0.50-1.0% of dispersing agent, 0.50-1.0% of leveling agent, 1.0-2.0% of heat stabilizer, 0.50-1.0% of defoaming agent, 0.50-1.0% of urea, 1.0-2.0% of isopropanol, 1.0-2.0% of glycol ether acetate, 1.0-2.0% of cysteine, 0.50-1.0% of sodium benzoate and 10-20% of pure water. The ink has the advantages of simple preparation technique and low cost, has favorable compatibility and favorable printing adaptability after being printed on a printing stock, and has the efficient, spectral and enduring antimicrobial functions.

In another embodiment, the antimicrobial ink 200 comprises an ink composition for a gravure printing produced by mixing an urethane resin, a polyester resin, a coloring agent and an antimicrobial agent of a natural organic material, and the like.

In another embodiment, the antimicrobial ink 200 comprises an antimicrobial environment-friendly offset printing ink which is prepared from the following raw materials in parts by weight: 4-5 parts of lavender essential oil, 0.3-0.4 part of limonene, 2-3 parts of oxidized starch, 0.5-0.6 part of active manganese peroxide, 0.5-0.6 part of phosphorus trichloride, 30-35 parts of rosin modified phenolic resin, 0.1-0.2 part of aluminum oxo-2-ethylhexoate, a right amount of mineral oil, 60-65 parts of soybean oil, 0.1-0.2 part of teri-butyl hydroperoxide, 20-30 parts of colorant, 1-2 parts of lanthanum isooctoate, 1.3-1.6 parts of methyl methacrylate and 2-3 parts of acrylic acid. By using the soybean oil instead of most of the petroleum solvent in the traditional ink, the VOC (volatile organic compound) of the offset printing ink is lowered to 15% below. By adding the oxidized starch, active manganese peroxide, acrylic acid and the like into the soybean oil, polymerization modification is performed to enhance the thixotropy of the ink, so that the ink can be easily solidified. By adding the lavender essential oil and limonene, the offset printing ink has mold resistance.

In another embodiment, the antimicrobial ink 200 is integrated into a printable substrate. For example, the antimicrobial ink 200 can be integrated with a face stock supporting indicia which are applied on (such as through thermal transfer printing) or through (such as through direct thermal printing) the container. The antimicrobial ink 200 can includes varnish compounds and antimicrobial compounds such as a silver zeolite ion that is configured to react to moisture with a controlled release of microbial disinfectant.

In another embodiment, the antimicrobial ink 200 comprises an antibacterial waterproof quick dry type water-based acrylic printing ink. The ink is prepared from the following raw materials in parts by weight: 35-40 parts of water-based acrylic resin emulsion, 0.5-0.8 part of zinc pyrithione, 4-5 parts of bis(dimethylamino) ethylether, 2-5 parts of yellow cinnamon leaf, 1-2 parts of ammonium zirconium carbonate, 4-5 parts of bottom ash, 30-34 parts of deionized water, 10-12 parts of water-based pigment, 3-5 parts of hydroxyethyl cellulose and 2-4 parts of an assistant. The raw materials of the printing ink can contain yellow cinnamon leaf water decoction, can give unique faint scent to the ink, and also has certain antimicrobial and antiseptic efficacies.

In another embodiment, the antimicrobial ink 200 comprises an antimicrobial UV curing printing ink, comprising 7-10 wt % of compound antibacterial agent, 10-25 wt % of pigment, 33-62 wt % of UV vehicle, 3.9-9 wt % of photoinitiator, 4-40 wt % of diluent, and 1-4 wt % of auxiliary agent.

In another embodiment, the antimicrobial ink 200 comprises a colloidal silver and/or copper and/or zinc added to an ink, aqueous fountain solution, or overprint. The antimicrobial metal in the ink can have a mean particle size of 0.6-500 nm. An outer coating can be formed from overprint varnish or aqueous fountain solution applied from a coating unit in a printing press.

In another embodiment, the antimicrobial ink 200 comprises an antibacterial functional printing layer. The antibacterial functional printing layer can be composed of water-soluble antimicrobial added in offset ink or gravure ink as much as 2-5 weight % to provide the container with an antibacterial effect.

In another embodiment, the antimicrobial ink 200 comprises antimicrobial immobilized 1,2-benzisothiazolin-3-one/zinc oxide (BIT/ZnO) complexes. The antimicrobial ink 200 can further comprise compositions comprising 1,2-benzisothiazolin-3-one which has been immobilized with zinc oxide.

In another embodiment, the antimicrobial ink 200 comprises an ink that includes a mixture of solvent and a silver salt biocide including a silver sulfate biocide having a concentration range of 0.0005 to 0.5 weight %.

In another embodiment, the antimicrobial ink 200 comprises an antimicrobial UV curing printing ink, comprising 7-10 wt % of compound antibacterial agent, 10-25 wt % of pigment, 33-62 wt % of UV vehicle, 3.9-9 wt % of photoinitiator, 4-40 wt % of diluent, and 1-4 wt % of auxiliary agent.

In another embodiment, the antimicrobial ink 200 comprises 100 portions by weight 2 portions by weight of methanol in the water, 50 portions by weight of rosin resin, 6 portions by weight of ethanolamine, a mixture of 1 portion by weight of the methanol and 6 portions by weight of ammonia water, 100 portions of the rosin oil, 35 portions of pigment, 10 to 15 portions of emulsifying oil, and 1 portion of antifoaming agent and 100 to 300 portions of water by weight portion, which is ground into a paste. To the paste is added 40 to 50 portions of the rosin oil, 3 portions of the emulsifying oil, 0.2 portion of the antifoaming agent, 0.5 portion of the ethanolamine, 3 portions of antimicrobial Nipagin esters, and 10 to 100 portions of the water by weight portion into 100 portions by weight of the paste.

In another embodiment, the antimicrobial ink 200 comprises an aqueous dispersion of silver chloride-coated titanium dioxide particles.

In another embodiment, the antimicrobial ink 200 comprises at least a colorant, an antibacterial substance and water, in which 1,2-benzisothiazolin-3-one and sodium 2-pyridinethiol-1-oxide are used concurrently as antibacterial substances.

In another embodiment, the antimicrobial ink 200 comprises a polyethylene resin 20-25 weight part, a polypropylene resin 35-40 weight part, a water ink dispersing solution 15-20 weight part, a mixed mineral powder 15 weight part, an antimicrobial agent 5 weight part, an inorganic antifungal agent 2 weight part, a thickening agent 2 weight part, a diatomaceous earth 5 weight part, a phytoncide powder 5 weight part, and an inorganic heat insulating phase change material 5-10 weight part.

In another embodiment, the antimicrobial ink 200 comprises an ink comprising an ionic silver or a chlorine compound.

In another embodiment, the antimicrobial ink 200 comprises a resin coating or printing ink containing antiviral fine particles comprising calcium hydroxide as a main component and having approximately uniform particle diameters.

In another embodiment, the antimicrobial ink 200 comprises an offset ink containing an antimicrobial agent.

In another embodiment, the antimicrobial ink 200 comprises an ink comprising zinc oxide, barium sulphate and bound silver ions.

In another embodiment, the antimicrobial ink 200 comprises 5-20 wt % compound antimicrobial agents in the base material of the ink. The compound antimicrobial agent can be a mixture of inorganic-organic compound antimicrobial agent and rosin modified phenolic resin. The inorganic-organic compound antimicrobial agent can comprise inorganic antimicrobial agent and organic antimicrobial agent. The inorganic antimicrobial agent can be phosphate or glassing micro powder loading silver ion, zinc ion, or silver-zinc compound ion.

In another embodiment, the antimicrobial ink 200 comprises an antibiotic additive and an ink composition including the antibiotic additive and a compound produced by binding of an antibiotic substance. The antimicrobial ink 200 can include a colorant, a solvent, and an antibiotic additive.

In another embodiment, the antimicrobial ink 200 comprises 60-70% by mass of acrylic oils with 2-3% of a dispersant, 20-30% of a pigment, glass beads, or pearl powder, 2-3% of an antifoaming agent and a leveling agent, and 1-2% of an anti-discoloring agent to the mixed acrylic oils. To impart an antibacterial property to the ink, 0.3% of a nanosilver solution having a nanosilver size of 1-5 nm and a nanosilver concentration of 10% can be added to the ink and uniformly mixed in an agitator.

In another embodiment, the antimicrobial ink 200 comprises an isothiazolinone, such as 1,2-benzisothiazolin-3-one, and a zinc compound selected from zinc salts, zinc oxides, zinc hydroxides, or combinations thereof. Useful zinc salts include for example, oxides, sulfates, chlorides, and combinations thereof. The antimicrobial composition can also contain co-biocides, such as pyrithiones, including zinc pyrithione or copper pyrithione.

In another embodiment, the antimicrobial ink 200 comprises an anti-microbial growth-inhibiting marking agent and anti-bacterial, anti-fungal, and anti-viral solution.

In another embodiment, the antimicrobial ink 200 comprises a synthetic resin coating comprising a mixture of ink and urushi lacquer. The synthetic resin coating can include an ink of 5-95 wt. % and urushi lacquer of 95-5 wt. %.

In another embodiment, the antimicrobial ink 200 comprises a water-based ink composition comprising a dye or colored resin particles containing a dye as a colorant, water and a phenylphenol salt that includes an alkali metal atom, a hydrogen atom, an alkyl group or a halogen group, or its derivative salt.

In another embodiment, the antimicrobial ink 200 comprises antimicrobial pigments, obtainable by agitating a suspension comprising one or more inorganic pigments and an antimicrobial compound, especially silver oxide.

In another embodiment, the antimicrobial ink 200 comprises a composition comprising iodopropynyl butyl carbamate and a bicyclic hydroxymethyl oxazolidine containing less than 0.1% of free formaldehyde.

In another embodiment, the antimicrobial ink 200 comprises a water-soluble, antimicrobial active polymer and an ink composition are prepared by coupling an antimicrobial active compound to a branch of polyvinylalcohol. The polymer can be added to the ink composition in an amount of 1 to 10 parts by weight based on 100 parts by weight of the ink composition.

In another embodiment, the antimicrobial ink 200 comprises a nano-silver containing ink, which is prepared by mixing 1-5 wt. % of nano-silver solution with 100 wt. % of the ink or 100 wt. % of a mixture of water and alcohol used for adjusting acidity of the ink. The nano-silver solution can be prepared by grinding silver to 20 nanometers in size, and then dispersing the silver powder in aqueous or oil based solvent.

In another embodiment, the antimicrobial ink 200 comprises a multifunctional ink obtained by admixing a photocatalytically functional material into an ink composition comprising a macromolecular compound hard to be electrostatically charged, rare element-containing minerals, tourmaline or far-infrared radiating ceramics, and a pigment or dye.

In another embodiment, the antimicrobial ink 200 comprises an anti-tetanic agent comprising a sasa extract, an anti-fungal agent comprising a sasa extract and an organic acid, an anti-viral agent comprising a sasa extract, an anti-microbial agent comprising sasa tannin, or an anti-microbial composition comprising a sasa extract and an organic acid.

In another embodiment, the antimicrobial ink 200 comprises a resin composition containing nano-sized silver particles produced by a capsulation process and a powdering process. The capsulation process is performed by mixing a silver colloid solution having a particle size of the silver being 1-100 nm and a concentration of the silver being 1-90%, monomers, an initiator, an emulsifier, and ion exchange water and then performing emulsion-polymerization, suspension-polymerization, or microemulsion-polymerization to coat silver particles with the resin composition. The powdering process is performed by spray-drying or coagulating the resin composition obtained by the capsulation process to obtain the resin composition powder. The obtained resin composition contains 0.01-90 wt % of the silver and has an average polymerization degree of 100-100,000.

In another embodiment, the antimicrobial ink 200 comprises allyl isothiocyanate extracted from wasabia *japonica* to an ink composition.

In another embodiment, the antimicrobial ink 200 comprises a printing ink containing nalidixic acid or its salt.

In another embodiment, the antimicrobial ink 200 comprises an amount of chlorhexidine, polymethylene biguanide, or salt thereof.

In another embodiment, the antimicrobial ink 200 comprises an ink containing 0.1-0.5 wt. % of crushed natural oyster shell particles having an average particle diameter of less than 8 micrometers.

In another embodiment, the antimicrobial ink 200 comprises a solvent type of resin or rubber is mixed with a foaming agent, an inorganic antimicrobial agent containing an antimicrobial metal that can irradiate radiation energy so that the bacterial cells are decomposed by the irradiation energy, an organic antimicrobial agent, and acaricidal agent or fungicidal agent.

In another embodiment, the antimicrobial ink 200 comprises a thermoplastic elastomer resin containing a colored pigment or the colored pigment and a filler. An antimicrobial agent can then be added to the resin.

In another embodiment, the antimicrobial ink 200 comprises a printing ink comprising pigment, synthetic resin, drying oil, petroleum solvent, and/or other solvents. A mixture of 3.5 parts by weight of a powdered antimicrobial agent prepared by intercalating a sparingly soluble phosphate with silver and 100 parts by weight can be added to the ink.

In another embodiment, the antimicrobial ink 200 comprises a composition including a 2-halo-2-halomethyl glutaronitrile, and a 4,5-polymethylene-4-isothiazolin-3-one.

In another embodiment, the antimicrobial ink 200 comprises chlorinated polyolefin having a chlorine content of 5 W50% separated from a carbon tetrachloride solution.

In another embodiment, the antimicrobial ink 200 comprises a compound comprising 2,4-dicyano-3,5,6-trifluorophenoxyethyl acrylate. In another embodiment, the antimicrobial ink 200 comprises an indonium ylide composition. In another embodiment, the antimicrobial ink 200 comprises N-phosphonomethylglycine reacted with herbicide. These are examples of the antimicrobial ink 200 only. Numerous others will be obvious to those of ordinary skill in the art having the benefit of this disclosure.

Figure 3:
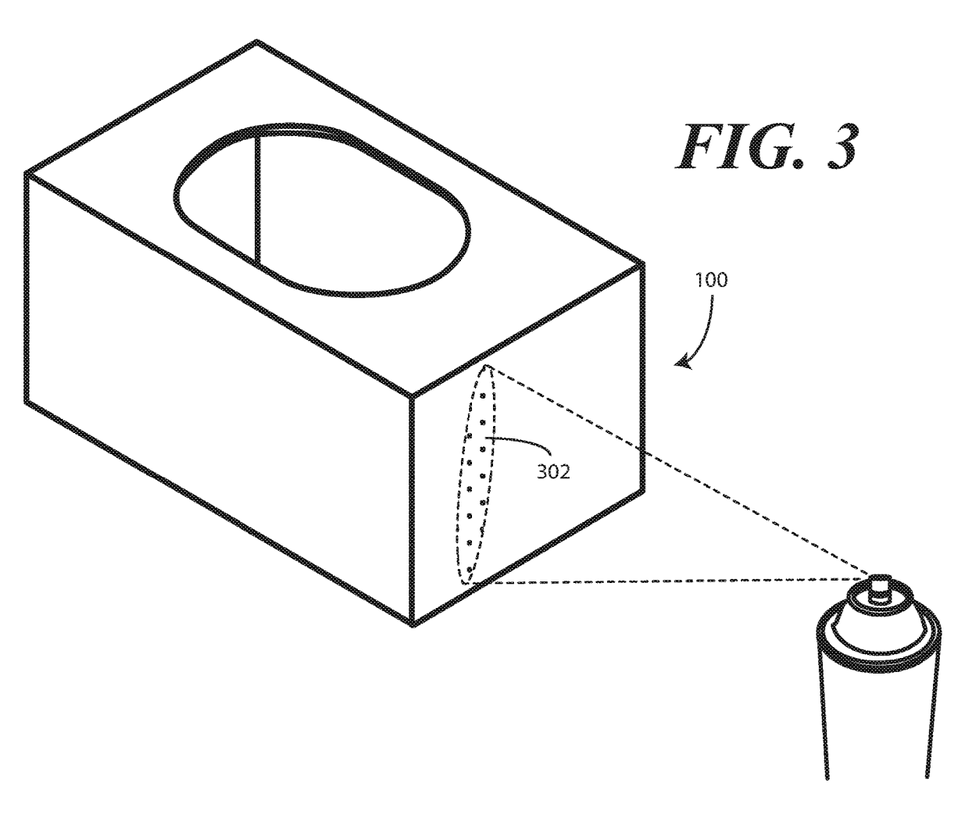
FIG. 3 illustrates one or more method steps in accordance with one or more embodiments of the disclosure.

Turning now to FIG. 3, illustrated therein is the container 100 of FIG. 1. As shown in FIG. 3, an antimicrobial coating 302 is applied to at least partially cover an exterior of the container 100.

In one embodiment, the antimicrobial coating 302 comprises only the antimicrobial ink (200). In other embodiments, the antimicrobial coating 302 comprises an antimicrobial paper obtained by treating paper with nalidixic acid or a salt thereof.

In yet another embodiment, the antimicrobial ink (200) is mixed with at least one other material to form a composite antimicrobial coating 302. Illustrating by example, in one embodiment the antimicrobial ink (200) is mixed with traditional ink to form the antimicrobial coating 302. In another embodiment, the antimicrobial ink (200) is integrated with a film coating layer to form the antimicrobial coating 302. In another embodiment, the antimicrobial ink (200) is integrated with a paint to form the antimicrobial coating 302. Other things with which the antimicrobial ink (200) can be integrated to form the antimicrobial coating 302 will be obvious to those of ordinary skill in the art having the benefit of this disclosure. For example, urethanes, oil-based coatings, latex coatings, polyester coatings, polyamide coatings, and other coatings can be used with the antimicrobial ink (200) to form the antimicrobial coating 302 in some embodiments.

The antimicrobial coating 302 can comprise various colors. For example, it can be a clear coating in one embodiment. In another embodiment, it can be a white coating. In another embodiment, it can be a colored coating, such as grey, red, blue, yellow, or green. In one embodiment, the antimicrobial coating 302 comprises a colored pigment selected to render markings disposed thereon visible to an onlooker.

Figure 4:
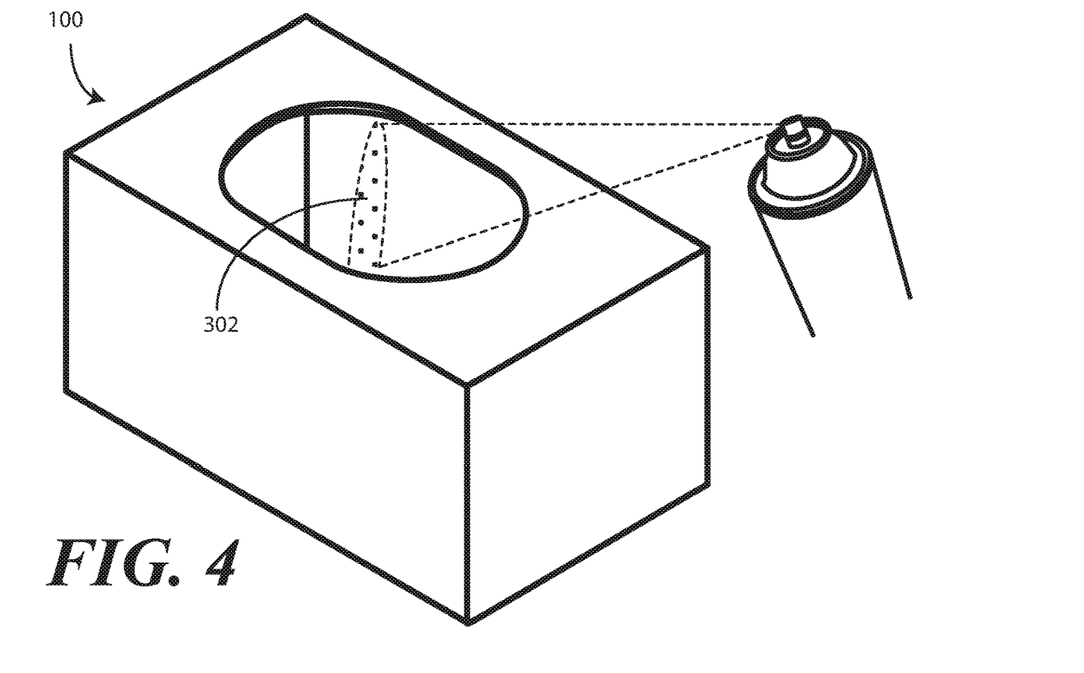
FIG. 4 illustrates one or more methods steps in accordance with one or more embodiments of the disclosure.
Figure 5:
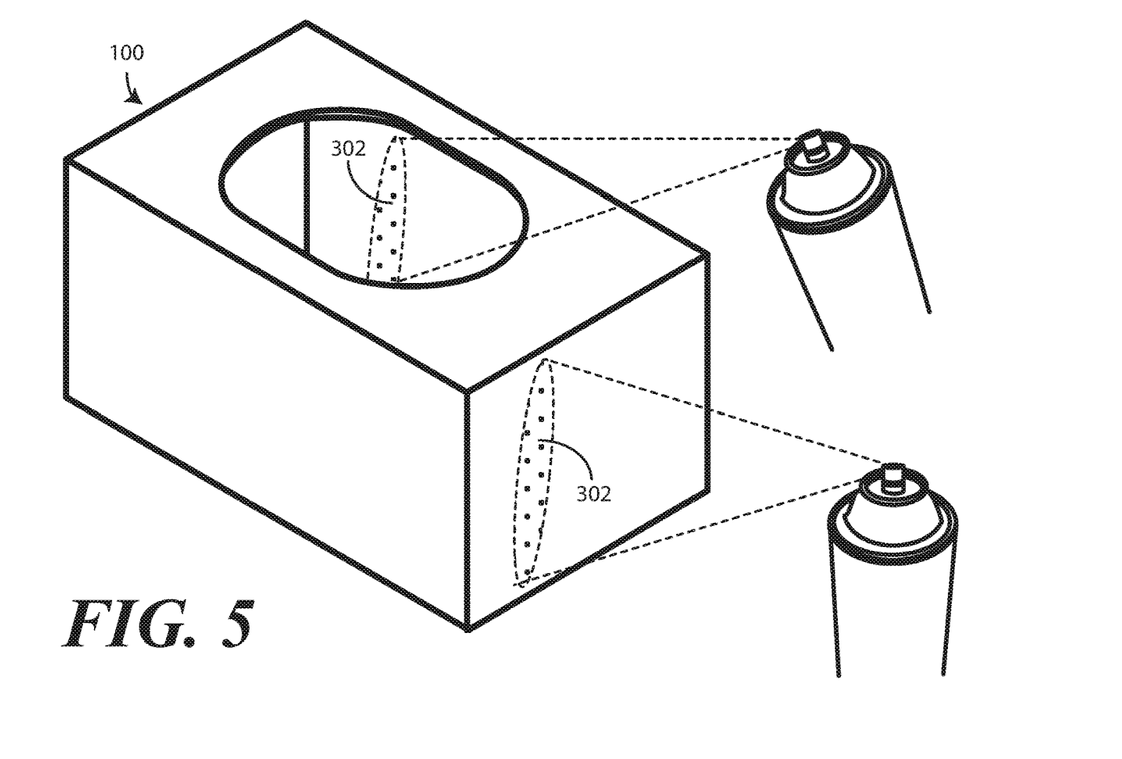
FIG. 5 illustrates one or more method steps in accordance with one or more embodiments of the disclosure.

The antimicrobial coating 302 can be deposited on various portions, or alternatively the entirety, of the container 100. For example, in FIG. 3, the antimicrobial coating 302 is disposed only on the exterior of the container 100. By contrast, in FIG. 4, the antimicrobial coating 302 is disposed only on the interior of the container 100. In FIG. 5, the antimicrobial coating 302 is disposed on both the interior and the exterior of the container 100.

Similarly, the antimicrobial coating 302 can be disposed only on certain sides of the container 100 as well. Illustrating by example, the antimicrobial coating 302 may be only disposed on the interior of the first side (101) in one embodiment. In another embodiment, the antimicrobial coating 302 is disposed only on the exterior of the first side (101). In still another embodiment, the antimicrobial coating 302 is disposed on both the interior and the exterior of the first side (101). The second side (102) can be similarly treated, i.e., with the antimicrobial coating 302 disposed on one of the interior of the second side (102), the exterior of the second side (102), or combinations thereof.

The same can be true with reference to the other sides (103,104,105). In one embodiment, the antimicrobial coating 302 may be only disposed on the interior of one or more of the other sides (103,104,105). In another embodiment, the antimicrobial coating 302 is disposed only on the exterior of the one or more of the other sides (103,104,105). In still another embodiment, the antimicrobial coating 302 is disposed on both the interior and the exterior of the one or more of the other sides (103,104,105). Where the container 100 can be configured in other shapes, including cubes, cylinders, pyramids, and other shapes, the antimicrobial coating 302 may be only disposed on certain sides or in certain regions.

In one embodiment, the antimicrobial coating 302 is disposed only on portions of the interior, exterior, or combined interior and exterior of the container 100. In another embodiment, the antimicrobial coating 302 is disposed on an entirety of the surface of the container 100. Of course, combinations of these can be used. For example, in one embodiment the antimicrobial coating 302 is disposed on an entirety of the interior of the container 100, but only on portions of the exterior of the container 100, or vice versa.

The antimicrobial coating 302 can be applied to the interior, exterior, or combined interior and exterior of the container 100 in a variety of ways. In the illustrative embodiment of FIGS. 3-5, the antimicrobial coating 302 is sprayed onto the container 100. After the spraying process is applied, the container 100 can be flashed out with a drying process. For example, if the antimicrobial coating 302 comprises the antimicrobial ink (200) suspended in water, after the spraying step the water can be flashed during a drying step to leave only a contact layer of the antimicrobial coating 302 along the container 100.

In one embodiment, the spraying of the antimicrobial coating 302 occurring in FIGS. 3-5 comprises spraying an amount of the antimicrobial coating 302 along the container so as to provide a predetermined amount of the antimicrobial coating 302 per unit weight. For example, in one embodiment this comprises spraying an amount of the antimicrobial coating 302 sufficient to apply an amount of the antimicrobial ink (200) that is about fifteen percent by weight of the one or more container sidewalls. In one embodiment, this can be achieved by spraying a solution comprising the antimicrobial ink (200) in water at a concentration of about ten percent.

In one embodiment, the antimicrobial coating 302 is selectively sprayed along the surface of the interior, the exterior, or the combined interior and exterior of the container 100. "Selectively spraying" or "selectively depositing" means that some portions of the container 100 are sprayed with the antimicrobial coating 302, while others are not sprayed. Said differently, the antimicrobial coating 302 can be "selectively" sprayed such that the antimicrobial ink (200) is applied to only select portions of the container.

In one or more embodiments, selectively depositing the antimicrobial coating 302 can lead to numerous advantages that are not possible with prior art methods. The selective spraying can result in repeating patterns, periodic patterns, non-repeating patterns, non-periodic patterns, symmetric patterns, asymmetric patterns, and free-form patterns of the antimicrobial ink (200) along the container surface.

After spraying, the container 100 can optionally be dried. For example, a flash drying process in which the container 100 is flash dried to remove all non-antimicrobial ink solution can be used. This leaves either a contact layer or internal particles of the antimicrobial ink (200).

Figure 6:
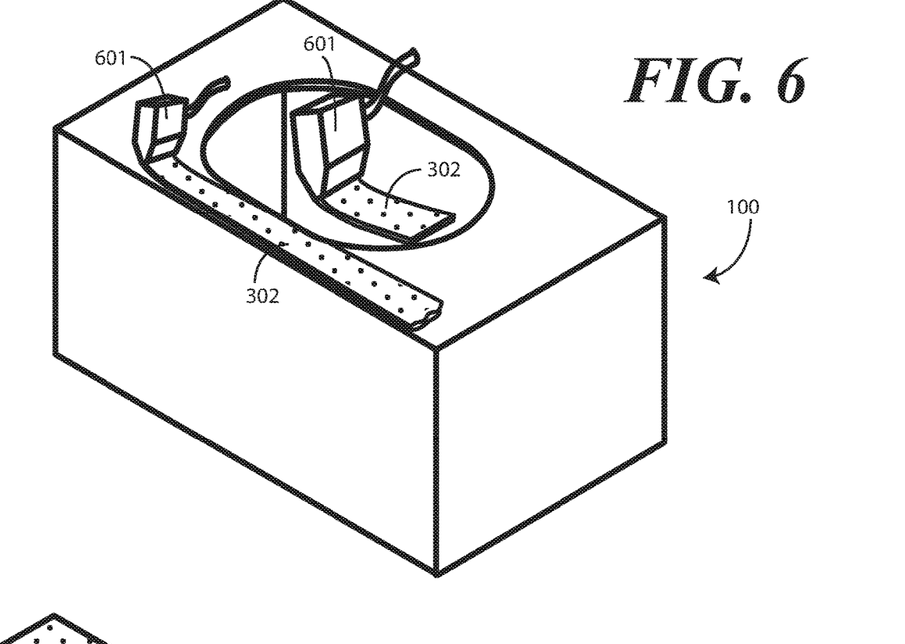
FIG. 6 illustrates one or more method steps in accordance with one or more embodiments of the disclosure.

Turning now to FIG. 6, illustrated therein is an alternate method of applying the antimicrobial coating 302. As shown in FIG. 6, the antimicrobial coating 302 is printed along the container 100. The antimicrobial coating 302 can be fed into an applicator 601 that prints the antimicrobial coating 302 on the container 100 at a predetermined concentration.

In one embodiment, a sufficient amount of antimicrobial coating 302 is applied to provide a predetermined amount of the antimicrobial ink (200) per unit area, or alternatively per unit weight, antimicrobial coating 302. The percentage of surface area covered with the aqueous antimicrobial coating 302, or the percentage by weight, can be selected based upon a particular medical application or desired antimicrobial effect. It will be obvious to those of ordinary skill in the art having the benefit of this disclosure that the amount of antimicrobial coating 302 applied will vary with intended usage of the container 100. The application of the antimicrobial coating 302, as well as the application of other, step can occur at predetermined temperature, pressure, or acidity.

In FIG. 6, the applicator 601 applies the antimicrobial coating 302 continually. In other embodiments, however, the applicator 601 applies the antimicrobial coating 302 intermittently in a selective pattern.

The antimicrobial coating 302 can be deposited on various portions, or alternatively the entirety, of the container 100. For example, in one embodiment the antimicrobial coating 302 is printed only on the exterior of the container 100. By contrast, in another embodiment the antimicrobial coating 302 is printed only on the interior of the container 100. In still another embodiment, the antimicrobial coating 302 is disposed on both the interior and the exterior of the container 100.

Similarly, the antimicrobial coating 302 can be disposed only on certain sides of the container 100 as well. Illustrating by example, the antimicrobial coating 302 may be only printed on the interior of the first side (101) in one embodiment. In another embodiment, the antimicrobial coating 302 is printed only on the exterior of the first side (101). In still another embodiment, the antimicrobial coating 302 is printed on both the interior and the exterior of the first side (101). The second side (102) can be similarly treated, i.e., with the antimicrobial coating 302 printed on one of the interior of the second side (102), the exterior of the second side (102), or combinations thereof.

The same can be true with reference to the other sides (103,104,105). In one embodiment, the antimicrobial coating 302 may be only printed on the interior of one or more of the other sides (103,104,105). In another embodiment, the antimicrobial coating 302 is printed only on the exterior of the one or more of the other sides (103,104,105). In still another embodiment, the antimicrobial coating 302 is printed on both the interior and the exterior of the one or more of the other sides (103,104,105). Where the container 100 can be configured in other shapes, including cubes, cylinders, pyramids, and other shapes, the antimicrobial coating 302 may be only printed on certain sides or in certain regions.

In one embodiment, the antimicrobial coating 302 is printed only on portions of the interior, exterior, or combined interior and exterior of the container 100. In another embodiment, the antimicrobial coating 302 is printed on an entirety of the surface of the container 100. Of course, combinations of these can be used. For example, in one embodiment the antimicrobial coating 302 is printed on an entirety of the interior of the container 100, but only on portions of the exterior of the container 100, or vice versa.

Figure 7:
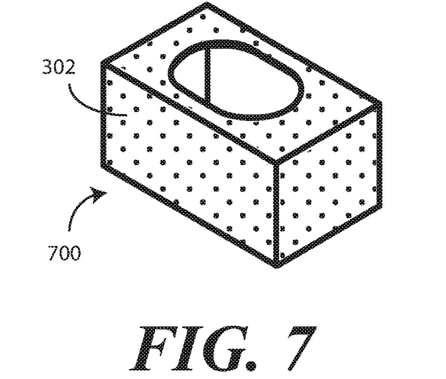
FIG. 7 illustrates one explanatory container in accordance with one or more embodiments of the disclosure.
Figure 8:
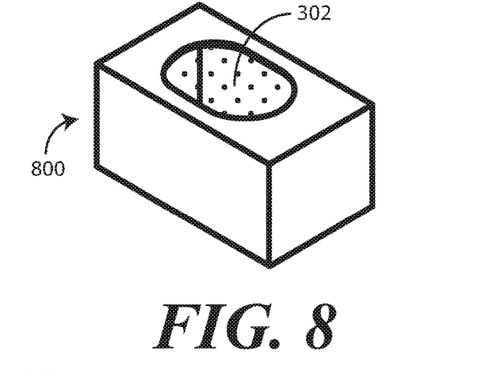
FIG. 8 illustrates another explanatory container in accordance with one or more embodiments of the disclosure.
Figure 9:
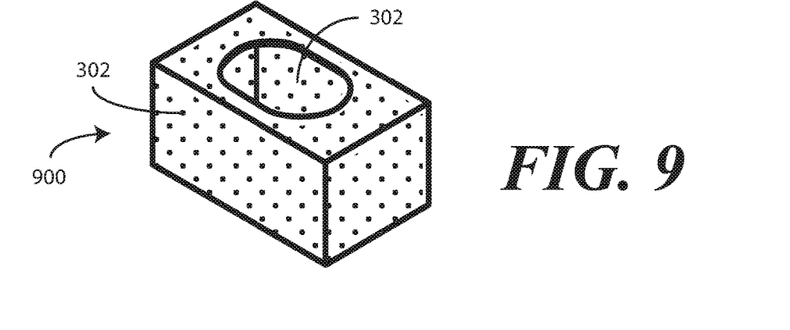
FIG. 9 illustrates yet another explanatory container in accordance with one or more embodiments of the disclosure.

Turning now to FIG. 7, illustrated therein is one explanatory container 700 where the antimicrobial coating 302 has been disposed only on the exterior of the container 700. By contrast, in FIG. 8 the antimicrobial coating 302 has been disposed only on the interior of the container 800. In FIG. 9, the antimicrobial coating 302 has been disposed on both the interior and the exterior of the container 900.

Figure 10:
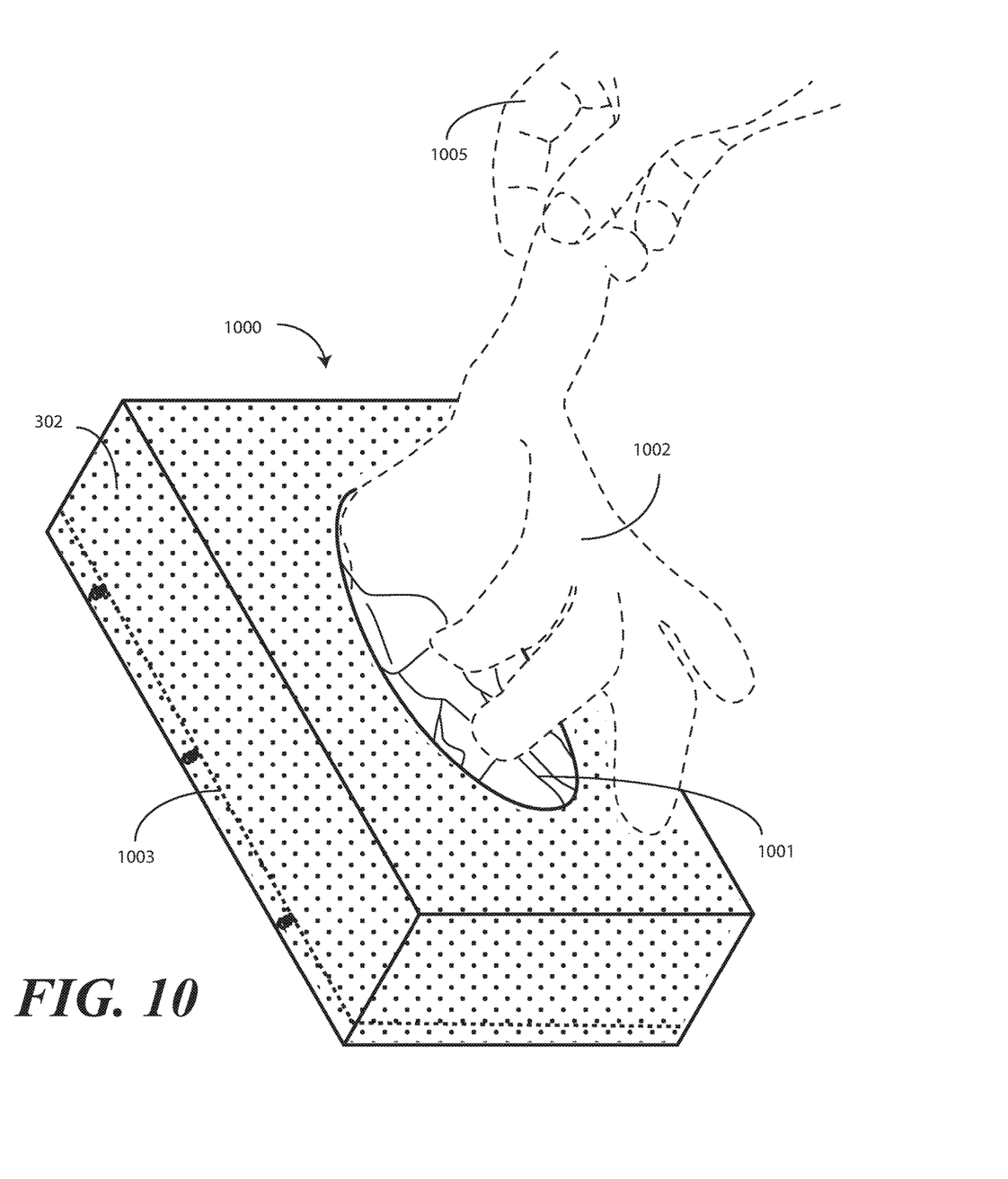
FIG. 10 illustrates still another explanatory container in accordance with one or more embodiments of the disclosure.

Turning now to FIG. 10, illustrated therein is a container 1000 that has been coated in the antimicrobial coating 302. In this illustrative embodiment, the interior and the exterior of the container 1000 has been coated in the antimicrobial coating 302. In other embodiments, only the exterior of the container 1000 is coated in the antimicrobial coating 302. In still other embodiments, only the interior of the container 1000 is coated in the antimicrobial coating.

As shown in FIG. 10, the container 1000 is a glove dispenser box, with a plurality of gloves 1001 disposed within the container 1000. A user 1005 is drawing the first glove 1002 from the container 1000. In this embodiment, the pressure exerted against the interior of the container 1000 by the plurality of gloves 1001 is sufficient enough that the act of drawing the first glove 1002 from the container 1000 causes the first glove 1002 to brush across interior surfaces of the container 1000, thereby contacting the antimicrobial coating 302.

In one or more embodiments, a spring base 1003 can be positioned within the container 1000 to press the plurality of gloves 1001 against the top of the container. With prior art glove containers, when the first glove is drawn, the force coefficient associated therewith can be higher than, for example, the force coefficient required to draw a later glove. The force coefficient associated with the first glove tends to be the highest of any of the plurality of gloves due to the gloves being manufactured from a compressible material and arranged in a stacked configuration. By including the spring base 1003, the force coefficient can remain relatively constant, which ensures that each glove drawn brushes across interior surfaces of the container 1000, thereby contacting the antimicrobial coating 302 in one or more embodiments. The spring base 1003 is optional, and can be omitted in other embodiments. In one or more embodiments, the spring base 1003 is also coated with the antimicrobial coating 302.

Figure 11:
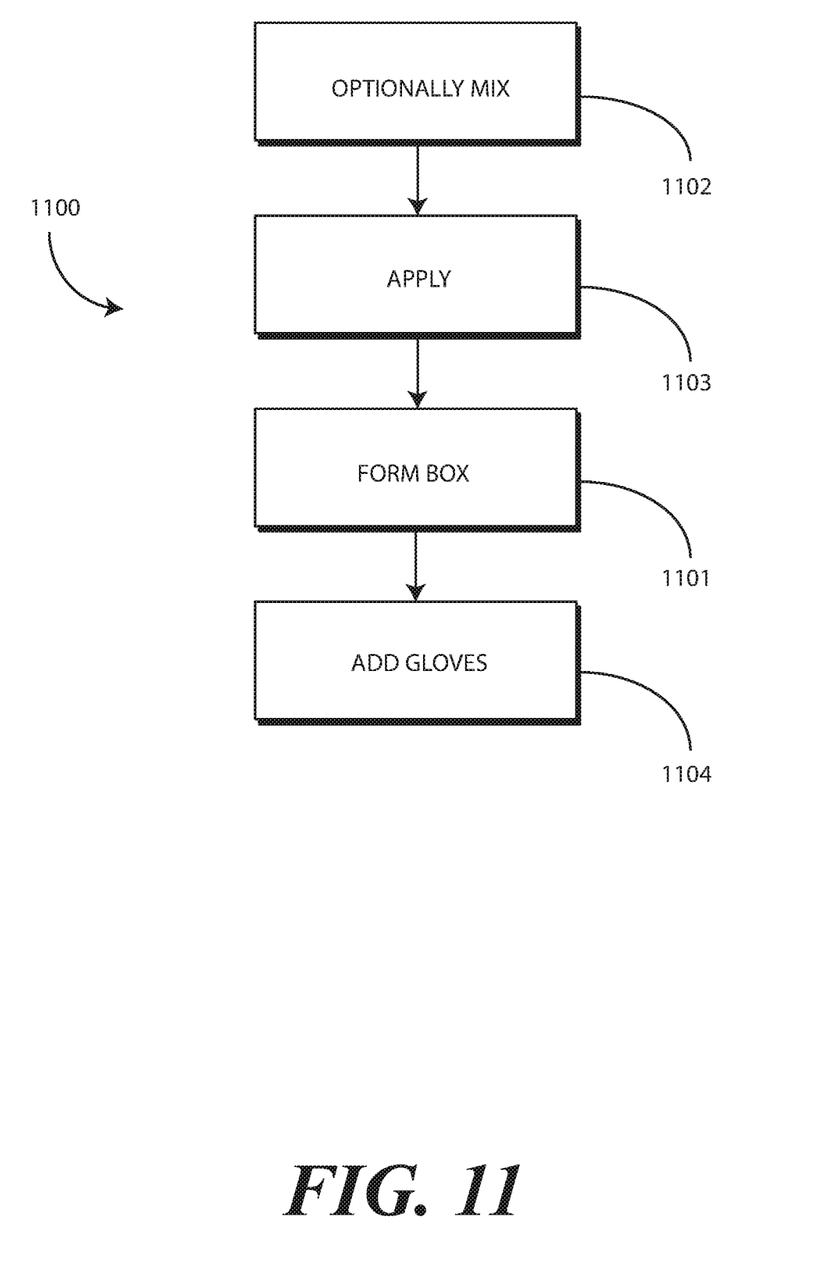
FIG. 11 illustrates one explanatory method in accordance with one or more embodiments of the disclosure.

Turning now to FIG. 11, illustrated therein is one explanatory method 1100 in accordance with one or more embodiments of the disclosure. At step 1101, the method 1100 includes forming a container from a first side, a second side, and a plurality of other sides. At step 1102, the method 1100 optionally comprises mixing an antimicrobial ink with a container coating, such as water, oil, paint, ink, an ultraviolet barrier to obtain an antimicrobial coating. In other embodiments, an antimicrobial ink alone will serve as the antimicrobial coating.

At step 1103, the method 1100 includes applying the antimicrobial coating to one or more of the first side, the second side, or the plurality of other sides. In one embodiment, step 1103 comprises applying the antimicrobial coating only to an exterior of the container. In another embodiment, step 1103 comprises applying the antimicrobial coating only to an interior of the container. In still another embodiment, step 1103 comprises applying the antimicrobial coating to both the interior and the exterior of the container. At step 1104, the method comprises disposing a plurality of gloves within the container.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A container, comprising:
    a first side, a second side, and a plurality of other sides, wherein the first side defines an opening;
    a plurality of gloves disposed within the container; and
    an antimicrobial coating disposed upon one or more of the first side, the second side, and the plurality of sides;
    wherein the antimicrobial coating is blended with a container coating, wherein the container coating comprises an ultraviolet barrier.

2. The container of claim 1, wherein the antimicrobial coating is disposed only on an exterior of the container.

3. The container of claim 1, wherein the antimicrobial coating is disposed only on an interior of the container.

4. The container of claim 1, wherein the antimicrobial coating is disposed on both an interior and an exterior of the container.

5. The container of claim 1, wherein the container coating comprises paint.

6. The container of claim 1, wherein the antimicrobial coating comprises an antimicrobial ink.

7. The container of claim 6, the antimicrobial ink is configured to disappear after a predetermined time in the presence of water.

8. The container of claim 6, wherein the antimicrobial ink comprises water, a co-solvent, a colorant, and composite nanoparticles.

9. The container of claim 6, wherein the antimicrobial ink is suspended in a water-based solution.

10. The container of claim 6, wherein the antimicrobial ink is suspended in an oil-based solution.

11. The container of claim 6, wherein the antimicrobial coating is selectively disposed only on portions of the container.

12. The container of claim 6, further comprising a spring base biasing the plurality of gloves against the first side such that a force coefficient required to draw any glove of the plurality of gloves is substantially constant.

13. The container of claim 6, further comprising a barrier that spans the opening.

14. The container of claim 13, the barrier comprising a film.

15. The container of claim 6, wherein the container is manufactured from single-ply cardboard.

16. The container of claim 6, wherein the container is manufactured from plastic.

17. A method of manufacturing a container, comprising:
    forming the container from a first side, a second side, and a plurality of other sides;
    applying an antimicrobial coating in asymmetric patterns to one or more of the first side, the second side, or the plurality of other sides; and
    disposing a plurality of gloves within the container.

18. The method of claim 17, further comprising mixing an antimicrobial ink with a container coating comprising an ultraviolet barrier to obtain the antimicrobial coating.

19. The method of claim 17, wherein the applying comprises applying the antimicrobial coating only to an exterior of the container.

20. The method of claim 17, wherein the applying comprises applying the antimicrobial coating only to an interior of the container.

* * * * *